US009814346B2

(12) United States Patent
De'Longhi et al.

(10) Patent No.: US 9,814,346 B2
(45) Date of Patent: Nov. 14, 2017

(54) INFUSION UNIT FOR A COFFEE MACHINE

(71) Applicants: Giuseppe De'Longhi, Treviso (IT); Davide Marcon, Fossalta di Trebaseleghe (IT)

(72) Inventors: Giuseppe De'Longhi, Treviso (IT); Davide Marcon, Fossalta di Trebaseleghe (IT)

(73) Assignee: De'Longhi Appliances S.R.L., Treviso (IT)

( * ) Notice: Subject to any disclaimer, the term of this patent is extended or adjusted under 35 U.S.C. 154(b) by 674 days.

(21) Appl. No.: 14/368,531

(22) PCT Filed: Dec. 14, 2012

(86) PCT No.: PCT/EP2012/075542
§ 371 (c)(1),
(2) Date: Jun. 25, 2014

(87) PCT Pub. No.: WO2013/098096
PCT Pub. Date: Jul. 4, 2013

(65) Prior Publication Data
US 2014/0373724 A1 Dec. 25, 2014

(30) Foreign Application Priority Data
Dec. 29, 2011 (IT) .............................. MI2011A2430

(51) Int. Cl.
*A47J 31/40* (2006.01)
*A47J 31/44* (2006.01)
*A47J 31/36* (2006.01)

(52) U.S. Cl.
CPC ....... *A47J 31/4403* (2013.01); *A47J 31/3609* (2013.01); *A47J 31/3614* (2013.01); *A47J 31/3619* (2013.01); *A47J 31/40* (2013.01)

(58) Field of Classification Search
CPC .... A47J 31/40; A47J 31/4403; A47J 31/3614; A47J 31/3619; A47J 31/3609
(Continued)

(56) References Cited

U.S. PATENT DOCUMENTS 5,964,142 A * 10/1999 Tio ...................... A47J 31/3614
99/289 R
7,024,985 B2 * 4/2006 Park .................... A47J 31/3619
99/289 R
(Continued)

FOREIGN PATENT DOCUMENTS

| EP | 1336365 | 8/2003 |
|----|---------|--------|
| EP | 1459663 | 9/2004 |
| EP | 1574157 | 9/2005 |

OTHER PUBLICATIONS

International Search Report dated Mar. 27, 2013; International Application No. PCT/EP2012/075542; International Filing Date: Dec. 14, 2012; 5 pages.

(Continued)

*Primary Examiner* — Andrea Wellington
*Assistant Examiner* — Nhat Chieu Do
(74) *Attorney, Agent, or Firm* — Blank Rome LLP

(57) ABSTRACT

An infusion unit having a closing piston, an infusion cylinder, and an ejection piston (for ejecting spent coffee). The piston can slide inside the infusion cylinder, between a retracted position and an extended position, for ejection of the spent coffee. Operation of the ejection piston can involve an oscillating rocker having a first arm (for driving the ejection piston) and a second arm (for engaging the oscillating movement of the rocker). The oscillating rocker can involve a first control cam arranged to generate oscillation in a direction driving toward the extended position of the ejection piston, or a second control cam arranged to generate (Continued)

oscillation in a direction driving toward the retracted position of the ejection piston.

15 Claims, 12 Drawing Sheets

(58) Field of Classification Search
USPC .................................. 99/302 P, 289 R, 297
See application file for complete search history.

(56) References Cited

U.S. PATENT DOCUMENTS

2010/0192778 A1* 8/2010 Magno ................ A47J 31/3614
99/287
2010/0319548 A1* 12/2010 Magno ................ A47J 31/3619
99/297

OTHER PUBLICATIONS

Written Opinion dated Mar. 27, 2013; International Application No. PCT/EP2012/075542; International Filing Date: Dec. 14, 2012; 8 pages.

* cited by examiner

INFUSION UNIT FOR A COFFEE MACHINE

RELATED APPLICATIONS

This application is a U.S. national phase application of International Application No. PCT/EP2012/075542, filed Dec. 14, 2012; which application claims priority to Italy Application No. MI2011A 002430, filed Dec. 29, 2011.

FIELD OF USE

The present invention refers to an infusion unit for a coffee machine

The infusion unit to which reference is being made is of the type having an infusion cylinder that is subjectable to reversible rotational-translational movement from a disengaged position to an engaged position with a closing piston for the creation of an infusion chamber in which the infusion water heated by a heater unit is conveyed and directed through a specific internal channelling to the closing piston.

The infusion cylinder internally has an ejection piston that moves in a coordinated manner with a scraper element for unloading the load of spent coffee.

BACKGROUND OF THE INVENTION

The known infusion units can sometimes have the drawback of having excessive dimensions, together with excessive structural intricacy also due, among other things, to the various mechanisms utilized for movement of the ejection piston in the infusion cylinder.

The technical task of the invention is therefore that of providing an infusion unit for a coffee machine, the infusion unit allowing for the elimination of the above-mentioned technical drawbacks of the prior art.

Within the scope of this technical task, an aim of the invention is to provide an alternative construction that proves to be structurally simple and compact for the infusion unit of a coffee machine.

SUMMARY OF THE INVENTION

The technical task, as well as these and other aims, according to the present invention, are achieved by realizing an infusion unit for a coffee machine, comprising a closing piston, an infusion cylinder that is subjectable to reversible rotational-translational travel between a position for loading a load of coffee, in which it is disengaged from the closing piston and has the axis inclined relative to the axis of the closing piston, and an infusion position in which it is engaged with the closing piston and has the axis in the direction of the axis of the closing piston, an ejection piston for ejecting the load of spent coffee, said piston sliding inside the infusion cylinder in the direction of the axis of the infusion cylinder between a retracted position and an extended position for ejection of the load of spent coffee, and operating means for the ejection piston, characterized in that said operating means comprises an oscillating rocker having a first arm provided with a member for driving the ejection piston and a second arm provided with a member for engaging the oscillating movement of the rocker selectively from a first control cam configured and arranged in such a manner as to generate an oscillation of the rocker in the direction corresponding to the driving towards the extended position of the ejection piston, or with a second control cam configured and arranged in such a manner as to generate an oscillation of the rocker in the direction corresponding to the driving towards the retracted position of the ejection piston.

The present invention also discloses an infusion unit for a coffee machine, comprising a closing piston, an infusion cylinder subjectable to reversible rotational-translational travel between a position for loading a load of coffee, in which it is disengaged from the closing piston and has the axis inclined relative to the axis of the closing piston, and an infusion position in which it is engaged with the closing piston and has the axis in the direction of the axis of the closing piston, an ejection piston for ejecting the load of spent coffee, said piston sliding inside the infusion cylinder in the direction of the axis of the infusion cylinder between a retracted position and an extended position for ejection of the load of spent coffee, operating means for the ejection piston and a scraper element for scraping the access mouth of the infusion cylinder and supported by the infusion cylinder in such a manner that it can oscillate reversibly between a first and a second rest position, and in such positions, it is offset from the access mouth of the infusion cylinder, characterized in that said scraper element has a first scraping surface operating to unload the load of spent coffee when the ejection piston is in the extended position and the scraper element oscillates from the first to the second rest position, and a second conveying surface operating to convey the load of coffee from a loader to the infusion cylinder when the ejection piston is in the retracted position and the scraper element remains in the second rest position.

Additional characteristics of the present invention are also defined in the dependent claims.

BRIEF DESCRIPTION OF THE DRAWINGS

Further characteristics and advantages of the invention will emerge more clearly from the description of a preferred, but not exclusive, embodiment of the infusion unit according to the invention, illustrated by way of non-limiting example in the attached drawings, wherein:

FIGS. 5 to 13 show the sequence of positions taken on by the infusion unit during a complete infusion cycle, in which FIG. 5 shows the infusion cylinder in the position for loading a load of coffee, FIG. 6 shows the infusion cylinder following the oscillation that aligns it to the closing piston, FIG. 7 shows the closure of the infusion chamber at the end of the upward translation of the infusion cylinder, FIG. 8 shows the opening of the infusion chamber after a tract of the downward translation of the infusion cylinder at the end of the infusion, FIG. 9 shows the extraction of the ejection piston during the final tract of the downward translation of the infusion cylinder, FIG. 10 shows the scraper element upon reaching the second rest position with which the ejection of the load of spent coffee is realized, FIG. 11 shows the oscillation of the infusion cylinder towards the position for loading a new load of coffee, FIG. 12 shows the retraction of the ejection piston, and FIG. 13 shows the infusion cylinder once again in the position for loading a new load of coffee.

DETAILED DESCRIPTION OF THE ILLUSTRATED EMBODIMENTS

Figure 1:
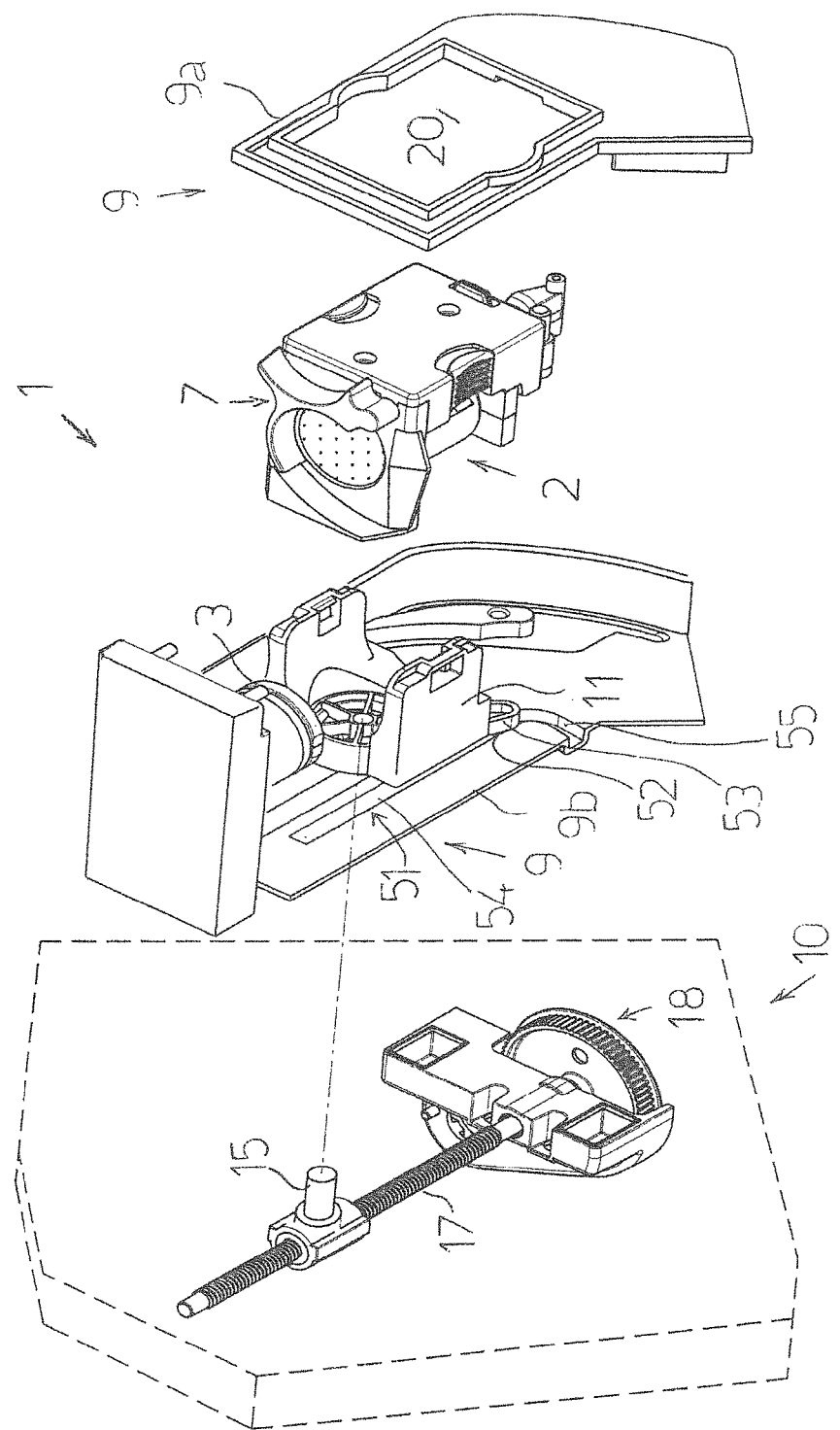
FIG. 1 is an exploded view of the infusion unit.
Figure 2:
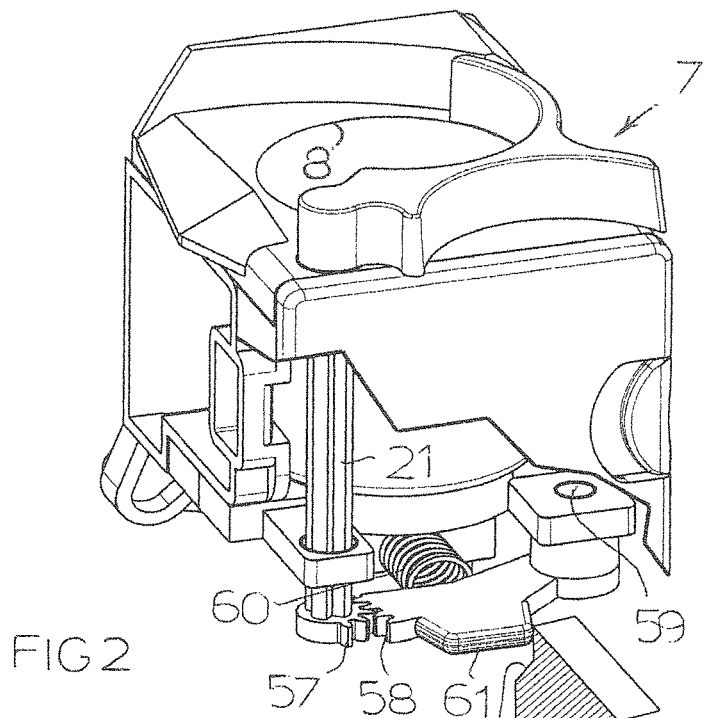
FIG. 2 shows the infusion cylinder with the scraper element in the first rest position.
Figure 3:
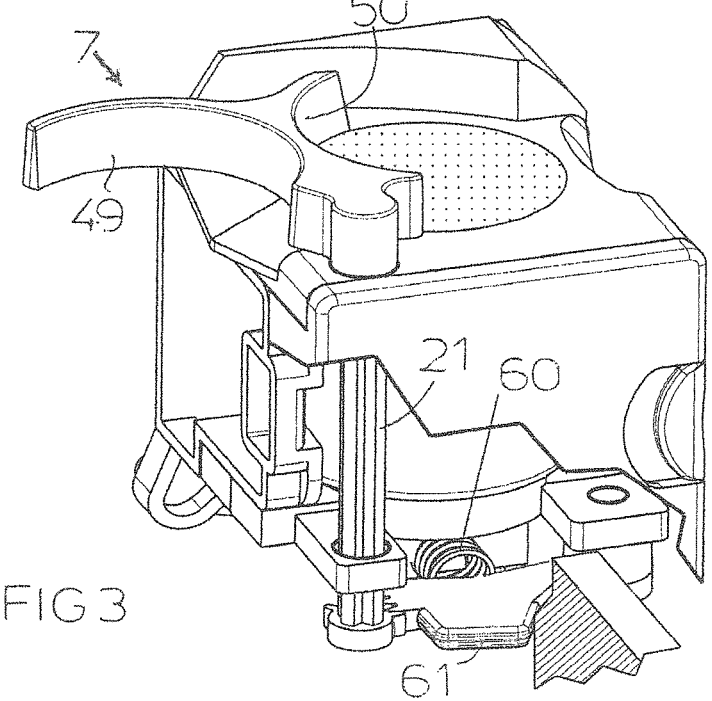
FIG. 3 shows the infusion cylinder with the scraper element in the second rest position.
Figure 4:
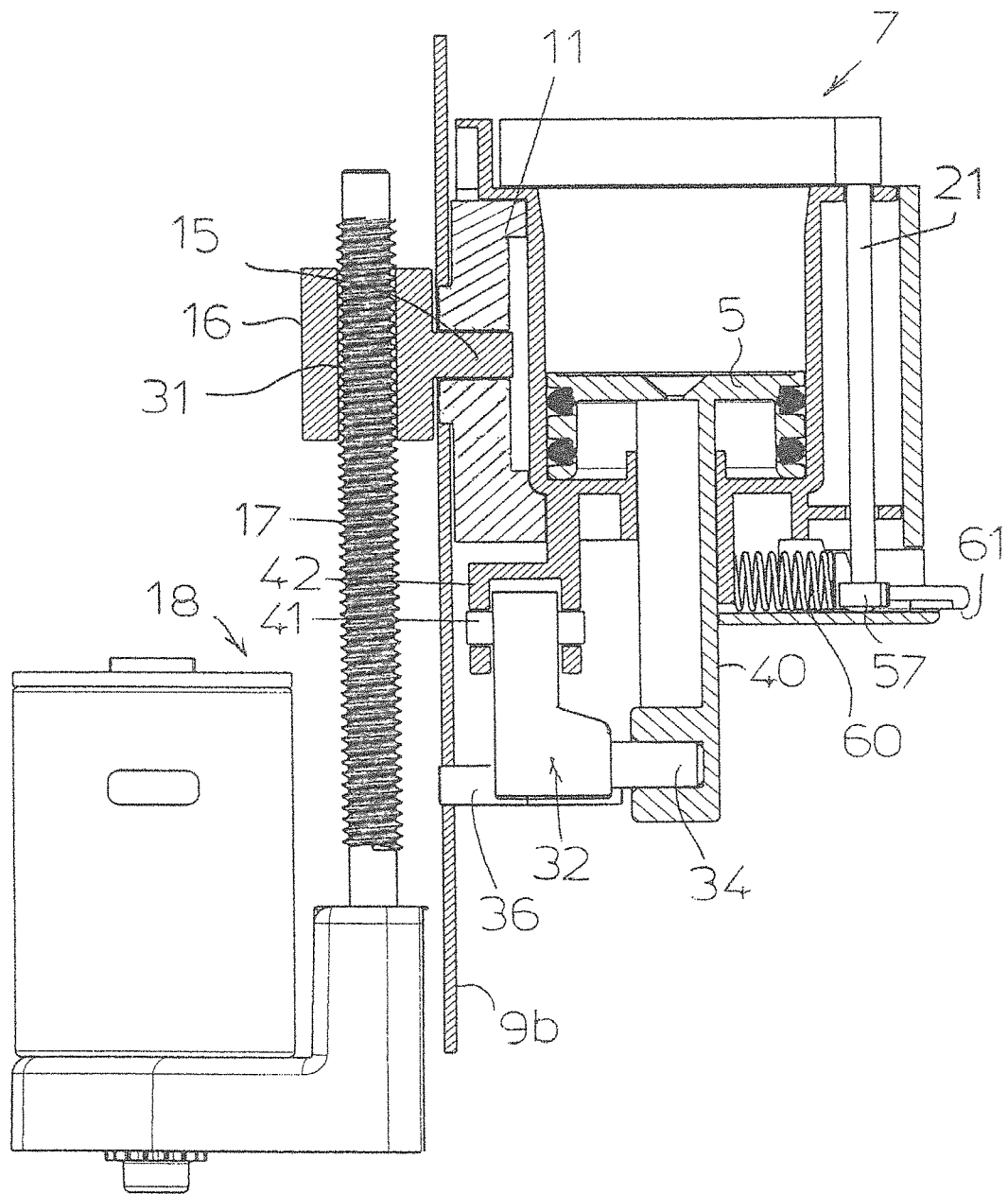
FIG. 4 is a section view of part of the infusion unit, illustrating the gear motor for movement of the carriage supporting the infusion cylinder.

With reference to the figures cited above, an infusion unit of a coffee machine is shown and indicated in its entirety by the reference number "1".

The infusion unit 1 comprises a hollow infusion cylinder 2 having an access mouth 8 engageable by a closing piston 3 so as to delimit an infusion chamber 4 in which there can be positioned a load of coffee 30 that can be supplied by a loader 6, an ejection piston 5 for ejecting the load of spent coffee 30 from the infusion chamber 4, and operating means for the ejection piston 5.

The infusion cylinder 2 is subjectable to reversible rotational-translational travel between a position for loading a load of coffee 30, in which it is disengaged from the closing piston 3 and has the axis inclined relative to the axis of the closing piston 3, and an infusion position in which it is engaged with the closing piston 3 and has the axis in the direction of the axis of the closing piston 3.

The infusion unit 1 preferably has a shell 9 formed in particular, but not necessarily, by two half-parts 9a, 9b associated one to the other and that delimit a compartment 13 for the reversible movement of the infusion cylinder 2.

The shell 9 is fixed to the casing 10 supporting the body and the other components of the coffee machine, or that in a different embodiment that is not shown, directly constitutes in itself the casing supporting the body and the other components of the coffee machine.

The closing piston 3 can be fixed to the shell 9 or to the casing 10 and it projects into the compartment 13 with an orientation of the axis thereof inclined with respect to the resting surface of the coffee machine.

The shell 9 or the casing 10 also supports the loader 6 and a collector 12 for the loads of spent coffee.

The ejection piston 5 slides inside the infusion cylinder 2 in the direction of the axis of the infusion cylinder 2 between a retracted position and an extended position for ejection of the load of spent coffee 30.

The infusion unit 1 further comprises a scraper element 7 for scraping the access mouth 8 of the infusion cylinder 2.

The scraper element 7 is supported by the infusion cylinder 2 in such a manner that it can oscillate reversibly between a first rest position and a second rest position, and in such positions, it proves to be offset from the access mouth 8 of the infusion cylinder 2.

In particular, the scraper element 7 is pivoted to the infusion cylinder 2 by means of an oscillation pin 21 positioned laterally to the access mouth 8 of the infusion cylinder 2.

The axis of oscillation of the scraper element 7 is oriented in the direction of the axis of the infusion cylinder 2.

The scraper element 7 has a first scraping surface 49 operating to unload the load of spent coffee 30 when the ejection piston 5 is in the extended position and the scraper element 7 oscillates from the first rest position to the second rest position, and a second conveying surface 50 operating to convey the load of coffee 30 from the loader 6 to the infusion cylinder 2 when the ejection piston 5 is in the retracted position and the scraper element 7 remains in the second rest position.

The first surface 49 of the scraper element 7 has an arcuate concave shape corresponding to the arcuate shape of the perimeter edge of the access mouth 8 of the infusion cylinder 2 and in the first rest position of the scraper element 7, it is positioned along a first portion of the perimeter edge of the access mouth 8 of the infusion cylinder 2.

The second surface 50 of the scraper element 7 has an arcuate concave shape corresponding to the arcuate shape of the perimeter edge of the access mouth 8 of the infusion cylinder 2 and in the second rest position of the scraper element 7, it is positioned along a second portion of the perimeter edge of the access mouth 8 of the infusion cylinder 2 diametrically opposite the first tract of the perimeter edge of the access mouth 8 of the infusion cylinder 2.

More specifically, the first surface 49 and the second surface 50 lie on the opposite side relative to a plane containing the fulcrum of oscillation of the scraper element 7.

The oscillation pin 21 of the scraper element 7 extends for the entire axial extension of the infusion cylinder 2 and at the end opposite the one that bears the scraper element 7, it has a toothed arc 57 in mesh with a toothed sector 58 that is pivoted to the infusion cylinder 2 by means of an oscillation pin 59 oriented in the direction of the axis of oscillation of the scraper element 7.

The toothed sector 58 can be oscillated in contrast to and by action of an elastic element 60 and it has a control tab 61 suitable for interfering with a cam 62 afforded on the internal side of the half-part 9b of the shell 9 for engaging the oscillating motion of the toothed sector 58.

Advantageously, the tab 61 is operated by the elastic element 60 during the upward translation of the infusion cylinder 2 so as to bring the scraper element 7 from the second rest position back to the first rest position.

The infusion cylinder 2 can be removably secured in a known manner to a carriage 11, which is translatable in the direction of the axis of the closing piston 3.

The shell 9 is preferably, but not necessarily, provided in particular in the half-part 9a thereof, with a window 20 through which the infusion cylinder 2 can be extracted from the compartment 13, once it has been removed from the carriage 11. The window 20 is directly accessible from the outside of the machine The carriage 11 is supported in an oscillating manner with an axis of oscillation oriented in a direction that is perpendicular to the direction of translation of the carriage 11.

In particular, the carriage 11 is supported in an oscillating manner by a pin 15, which, in turn, is supported by a cursor 16 internally exhibiting a female screw 31 engaged with a worm screw 17 that is oriented in the direction of the axis of the closing piston 3 and movable by a gear motor 18.

For execution of the oscillation of the carriage 11, the half-part 9b of the shell 9 has a cam in the form of a slot 51 in which the pin 52 is engaged, borne by an offshoot 53 of the carriage 11.

The cam 51 has a rectilinear portion 54 oriented in the direction of the axis of the closing piston 3 and a curvilinear portion 55.

The unit for moving the cursor 16, comprising the gear motor 18 and the worm screw 17, is supported by the casing 10 externally of the shell 9.

The cursor 16 is arranged through a rectilinear slit 19 made through the thickness of the wall of the half-part 9b of the shell 9 and oriented in the direction of the axis of the closing piston 3.

Advantageously, the operating means comprises an oscillating rocker 32 having a first arm 33 provided with a member for driving the ejection piston 5 and a second arm 35 provided with a member for engaging the oscillating movement of the rocker 32 selectively from a first control cam 37 configured and arranged in such a manner as to generate an oscillation of the rocker 32 in the direction corresponding to the driving towards the extended position of the ejection piston 5, or with a second control cam 38 configured and arranged in such a manner as to generate an oscillation of the rocker 32 in the direction corresponding to the driving towards the retracted position of the ejection piston 5.

The rocker 32 is pivoted by means of an oscillation pin 41 to a lower extension 42 of the infusion cylinder 2.

In a possible, unillustrated variant of the invention, the rocker 32 may instead be pivoted to the carriage 11.

The axis of oscillation of the rocker 32 is oriented in the direction of the axis of oscillation of the carriage 11.

The driving member is constituted by a driving pin 34 oriented in the direction of the axis of oscillation of the rocker 32 and engaged slidingly in a closed transverse slot 39 afforded in the stem 40 of the ejection piston 5.

The engaging member is constituted by an engaging pin 36 oriented in the direction of the axis of oscillation of the rocker 32. The driving member 34 is positioned at the end of the first arm 33 of the rocker 32, whereas the engaging member 36 is positioned at the end of the second arm 35 of the rocker 32.

The rocker 32 preferably has an angular conformation, and in particular, the first arm 33 and the second arm 35 of the rocker 32 are of different lengths so as to achieve an increase or a reduction, as needed, in the movement of the driving pin 35 with respect to the engaging pin 36.

The first control cam 37 is afforded on a longitudinal element 43 oscillating in contrast to and by action of an elastic element (not show) between a position resting against a stop 44 and a position disengaged from the stop 44.

The elastic element is configured and arranged in such a manner as to keep the longitudinal element 43 normally pressed against the stop 44.

The longitudinal element 43 is pivoted to the shell 9, and particularly to the half-part 9b thereof, by means of an oscillation pin 45 oriented in the direction of the axis of oscillation of the rocker 32.

The second control cam 38 is afforded by an inclined plane 46 present in the shell 9, and particularly in the half-part 9b thereof.

The shell 9, and particularly the half-part 9b thereof, has a guide for the engaging pin 36, the guide being defined by the lateral delimiting wall 47 of a lower part 48 present in the internal side of the half-part 9b of the shell 9.

The elongated element 43 is also positioned in its entirety in the lower part 48.

The second control cam 38 and the stop 44 are afforded from shaped portions of the lateral delimiting surface 47 of the lower part 48.

The infusion unit 1 is specifically, but not necessarily, of a known type having a system for conveying the infusion of coffee towards a remote dispenser (not shown).

The conveying system has a first flexible hose 63 and a second flexible hose 64 in communication with each other through a chamber 65 afforded in a block 66 laterally supported by the closing piston 3.

The first hose 63 is connected to the remote dispenser, whereas the second hose 64 is connected to an outlet hole (not shown) for the infusion of coffee from the infusion cylinder 2.

For discharge of the infusion of coffee remaining inside the hoses 63 and 64, there is provided in a known manner a shutter 67 of a hole 68 suitable for putting the hoses 63 and 64 in direct communication with the atmosphere.

The shutter 67 is movable, in contrast to and by action of a spring 69, between a position for closing the hole 68 during infusion and an open position established for the opening of the hole 68 at the end of the infusion process for discharge by gravity of the remaining infusion of coffee.

The operation of the infusion unit 1 is the following.

Figure 5:
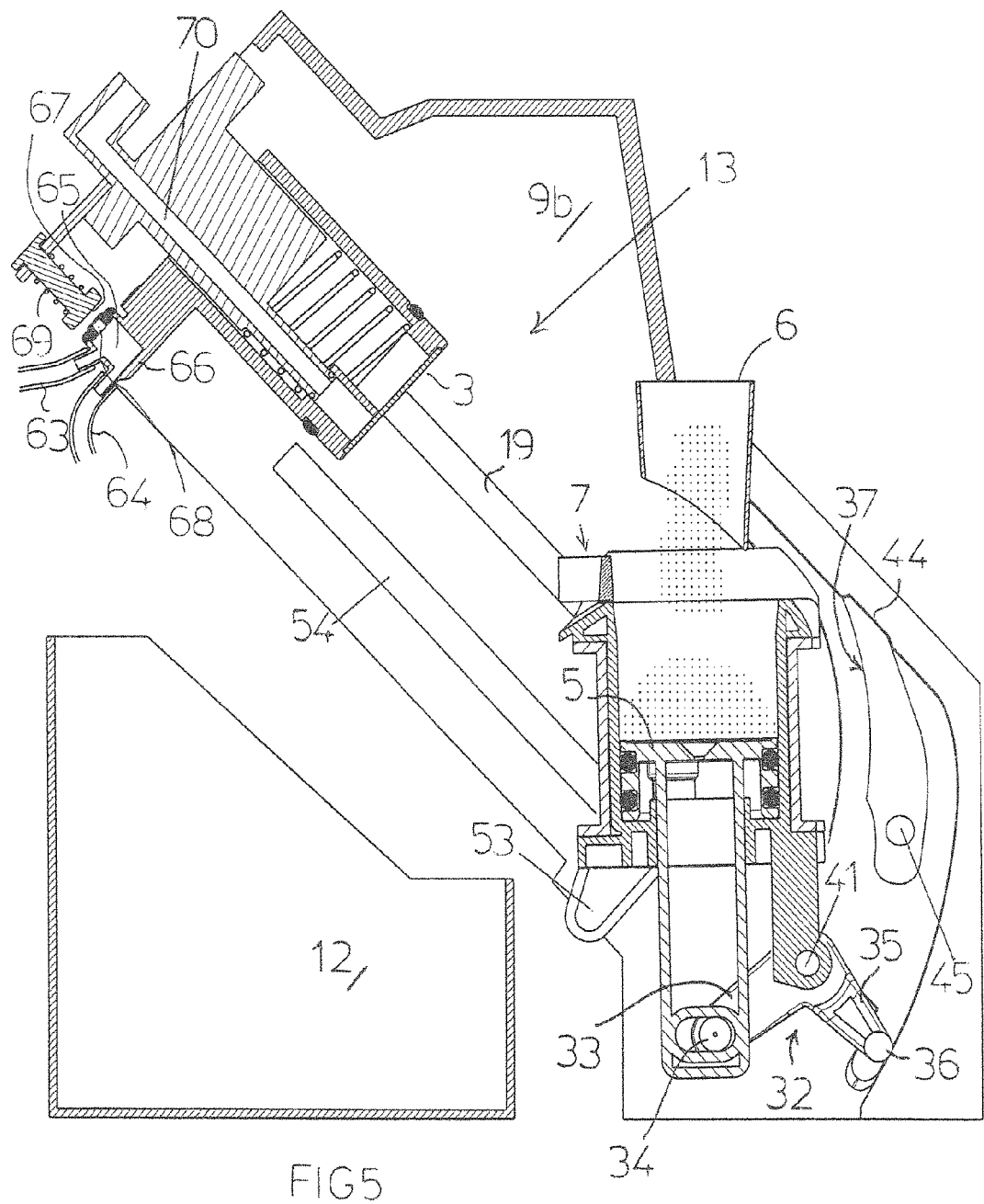

Upon travel start, the infusion cylinder 2 is found below the loader 6 with the axis in a vertical direction or slightly inclined with respect to the vertical direction (FIG. 5). The ejection piston 5 is in the retracted position. The scraper element 7 is in the second rest position, in which the second surface 50 conveys towards the access mouth 8 of the infusion cylinder 2, the load of powdered coffee 30 supplied by the loader 6. Advantageously, this conveying task is performed by the scraper element 7, without requiring a separate element specifically dedicated to this task, as is the case today in a traditional infusion unit.

When loading of the powdered coffee in the infusion cylinder 2 is completed, the gear motor 18 sets in rotation the worm screw 17 along which the cursor 16 translates by effect of the coupling with the worm screw 17 by means of the female screw 31.

The carriage 11 pivoted to the cursor 16 begins to drive the infusion cylinder 2 upwards.

Figure 6:
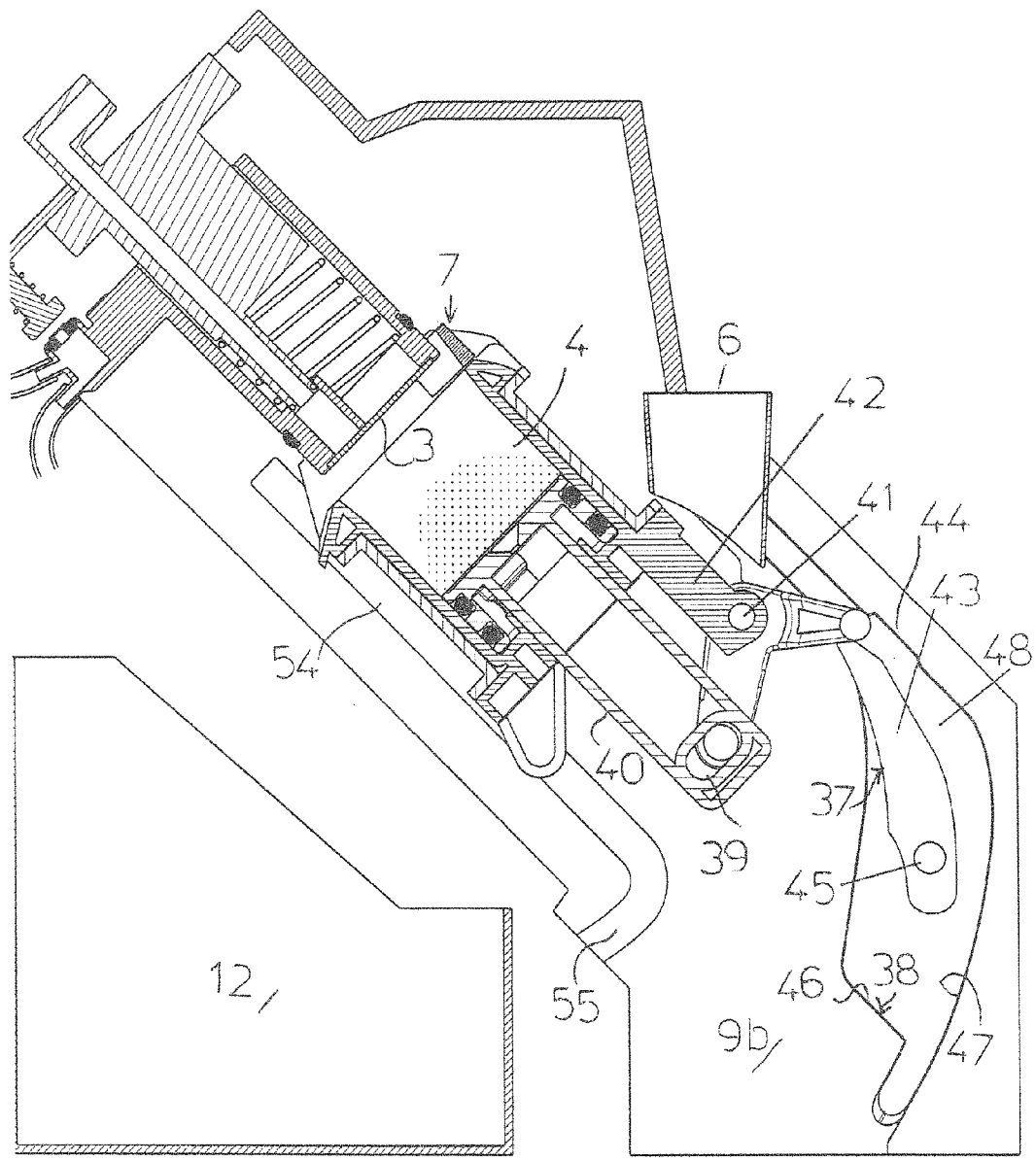

During the initial part of the upward drive, the pin 52 travels along the curvilinear portion 55 of the cam 51, which causes the oscillation (counter clockwise in the figures) of the carriage 11 and as a consequence, of the infusion cylinder 2, until the axis of the latter is aligned to the axis of the closing piston 3. In the next upward movement (FIG. 6), the infusion cylinder 2 maintains the same angular orientation, given that the pin 52 travels along the rectilinear portion 54 of the cam 51.

During this same upward movement of the infusion cylinder 2, the engagement of the tab 61 with the cam 62 takes place, with the consequent oscillation of the toothed sector 58, by effect of the spring 60.

The oscillation of the toothed sector 58 is transmitted to the toothed arc 57, to which the oscillation pin 21 of the scraper element 7 is solidly constrained and the scraper element 7 is thus brought from the second to the first rest position.

Advantageously, the resetting of the scraper element 7 during the upward travel of the infusion cylinder 2, rather than during an extra run thereof at the end of the travel downward, as instead occurs traditionally, contributes to limiting the axial dimensions of the infusion unit 1.

During the upward travel of the infusion cylinder 2, the engaging pin 36 slides along the guide 47 and wedges in between the stop 44 and the elongated element 43, which yields, compressing the elastic element by which it is activated, enabling the passage of the engaging pin 36. Following the passage of the engaging pin 36, the elongated element 43 is brought back against the stop 44 by effect of the stretching of the elastic element against which it was previously compressed.

Figure 7:
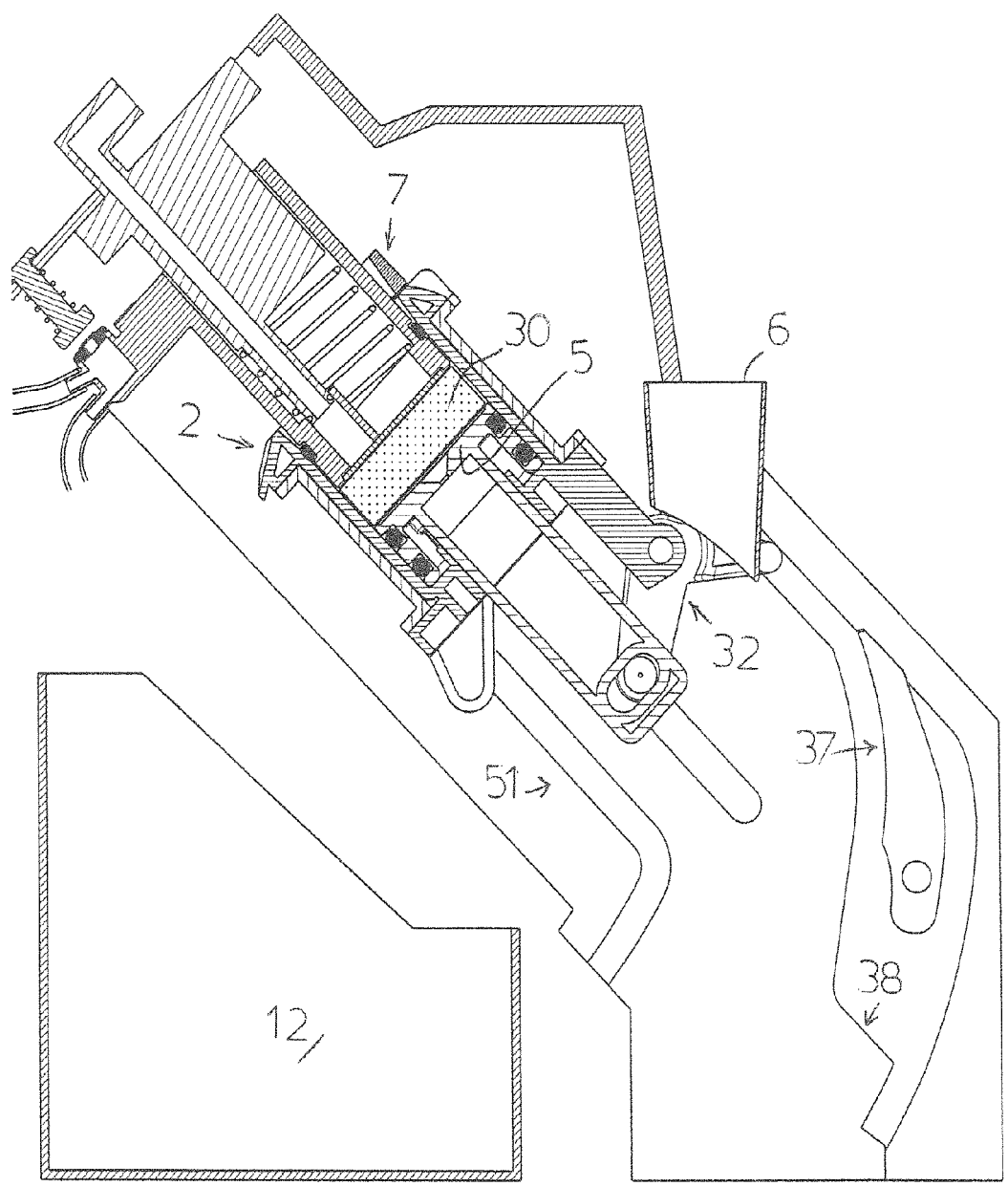

The infusion cylinder 2 then engages with the closing piston 3 (FIG. 7).

The infusion cylinder 2 stops in this position with the ejection piston 5 still in the retracted position.

For the infusion, an internal conduit 70 of the closing piston 3 is supplied with a flow of water expressly heated by a heater unit provided for this purpose (not shown). The hot water for infusion is injected into the infusion chamber and the resulting infusion is extracted by means of the specific outlet hole provided in the infusion cylinder 2.

Upon completion of the infusion process, the downward movement of the infusion cylinder 2 begins, having been made possible by the reversal of the movement transmitted by the gear motor 18.

Figure 8:
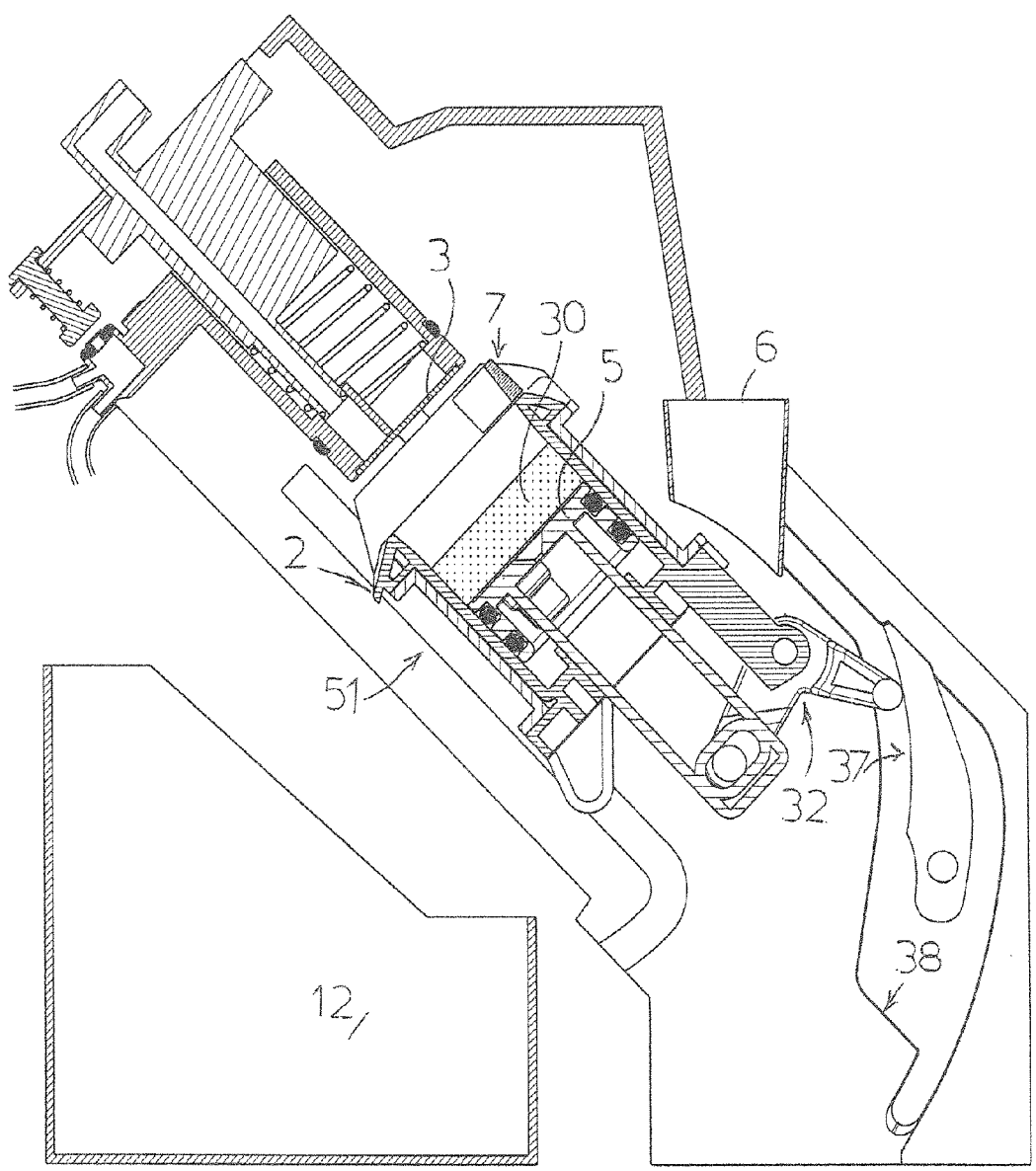
Figure 9:
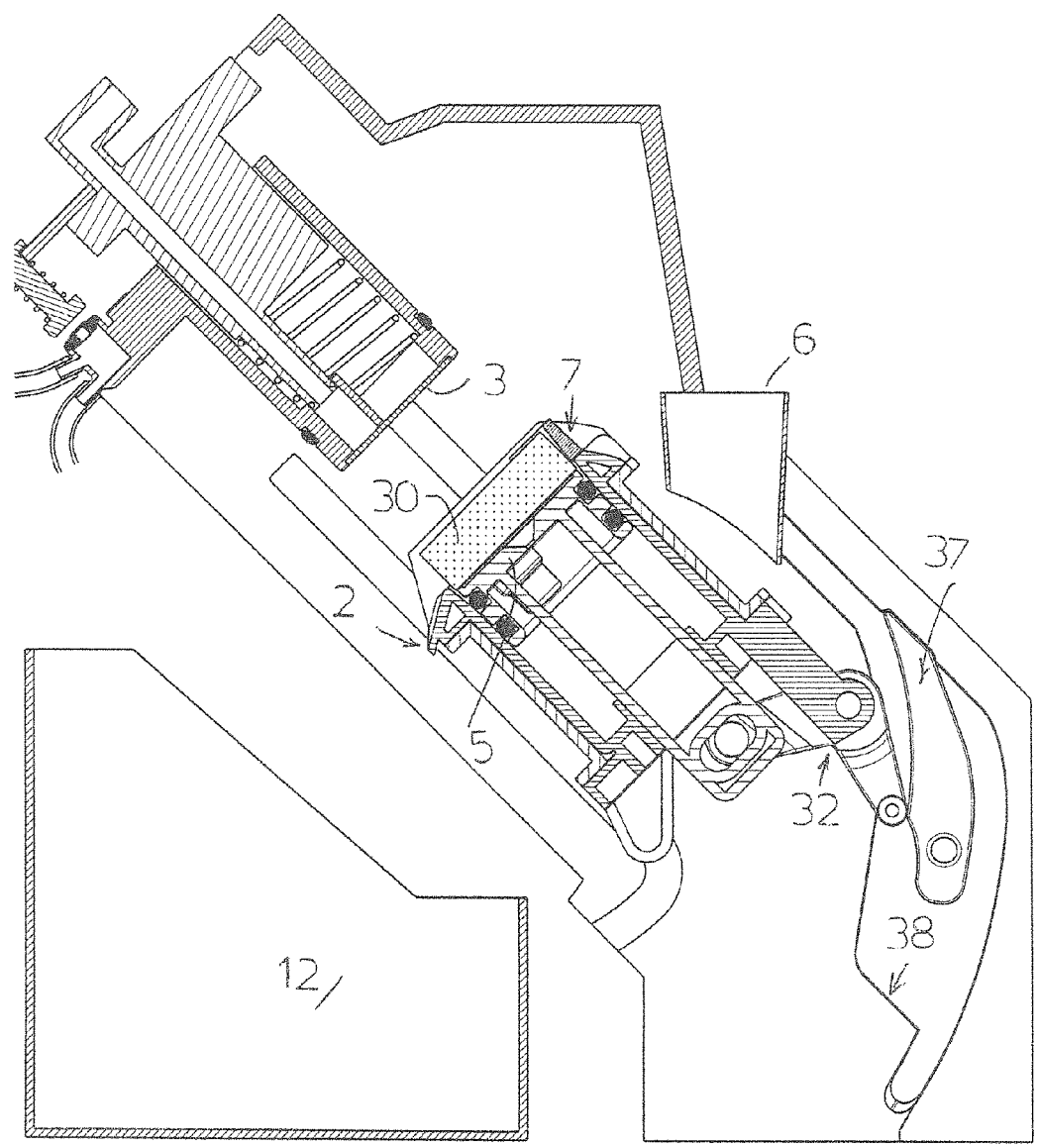
Figure 10:
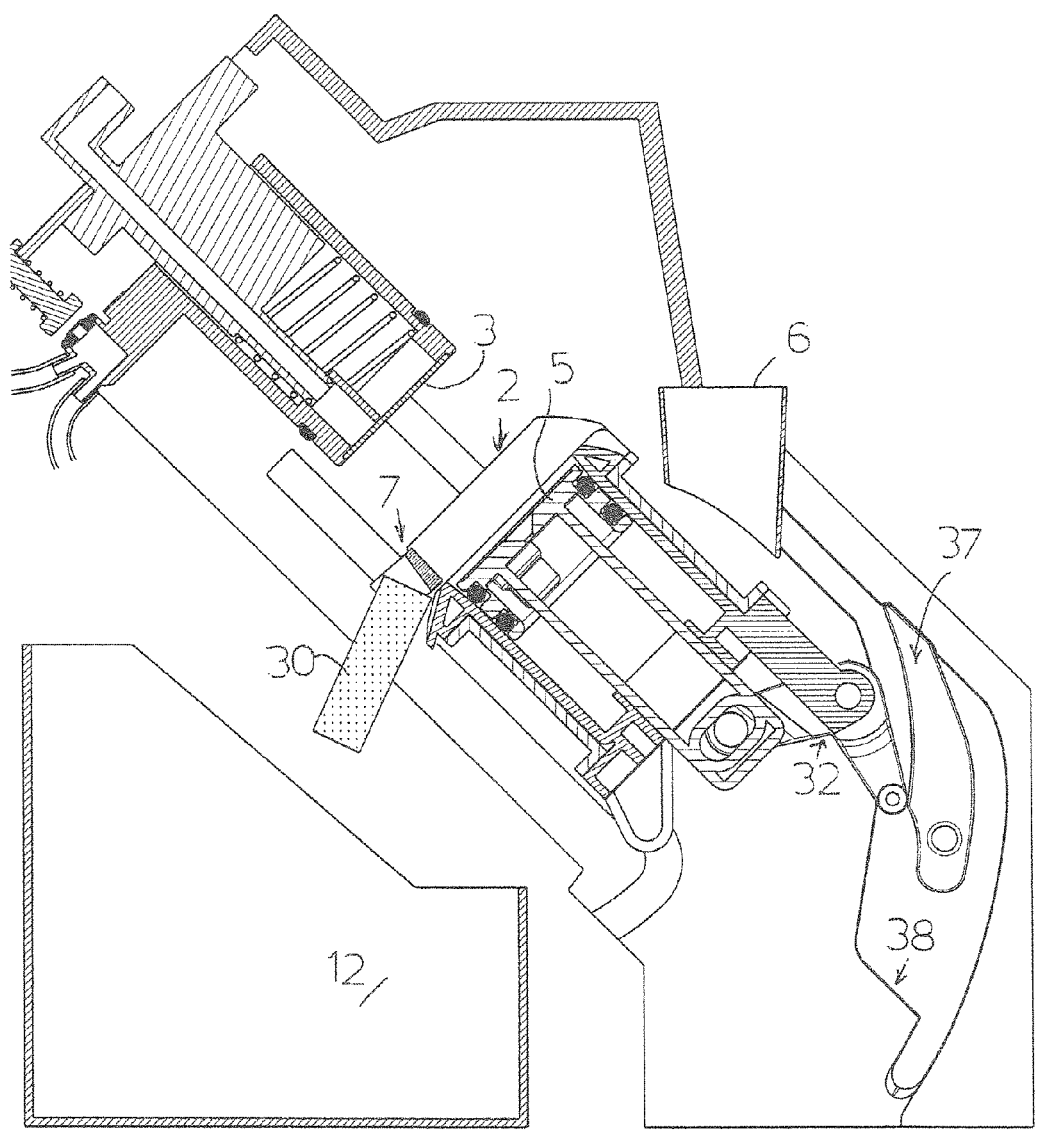

During execution of the initial downward translation (FIG. 8), the infusion cylinder 2 disengages from the closing piston 3 and the engaging pin 36 engages with the first control cam 37, which remains locked against the stop 44. By effect of sliding along the first control cam 37, the engaging pin 36 is subjected to a force of movement that causes the oscillation of the rocker 32 (in a clockwise direction in the drawings) around the oscillation pin 41. The oscillation of the rocker 32 causes the movement of the driving pin 34, which by effect of the engagement in the slot 39 drives the stem 40 of the ejection piston 5 towards the extraction position (FIG. 9). When the ejection piston 5 reaches the extraction position, the scraper element 7 is moved from the first rest position to the second rest position by effect of the engagement of the tab 61 with the cam 62. The first surface 49 of the scraper element 7 laterally moves the load of spent coffee 30, which falls into the collector 12 (FIG. 10).

Figure 13:
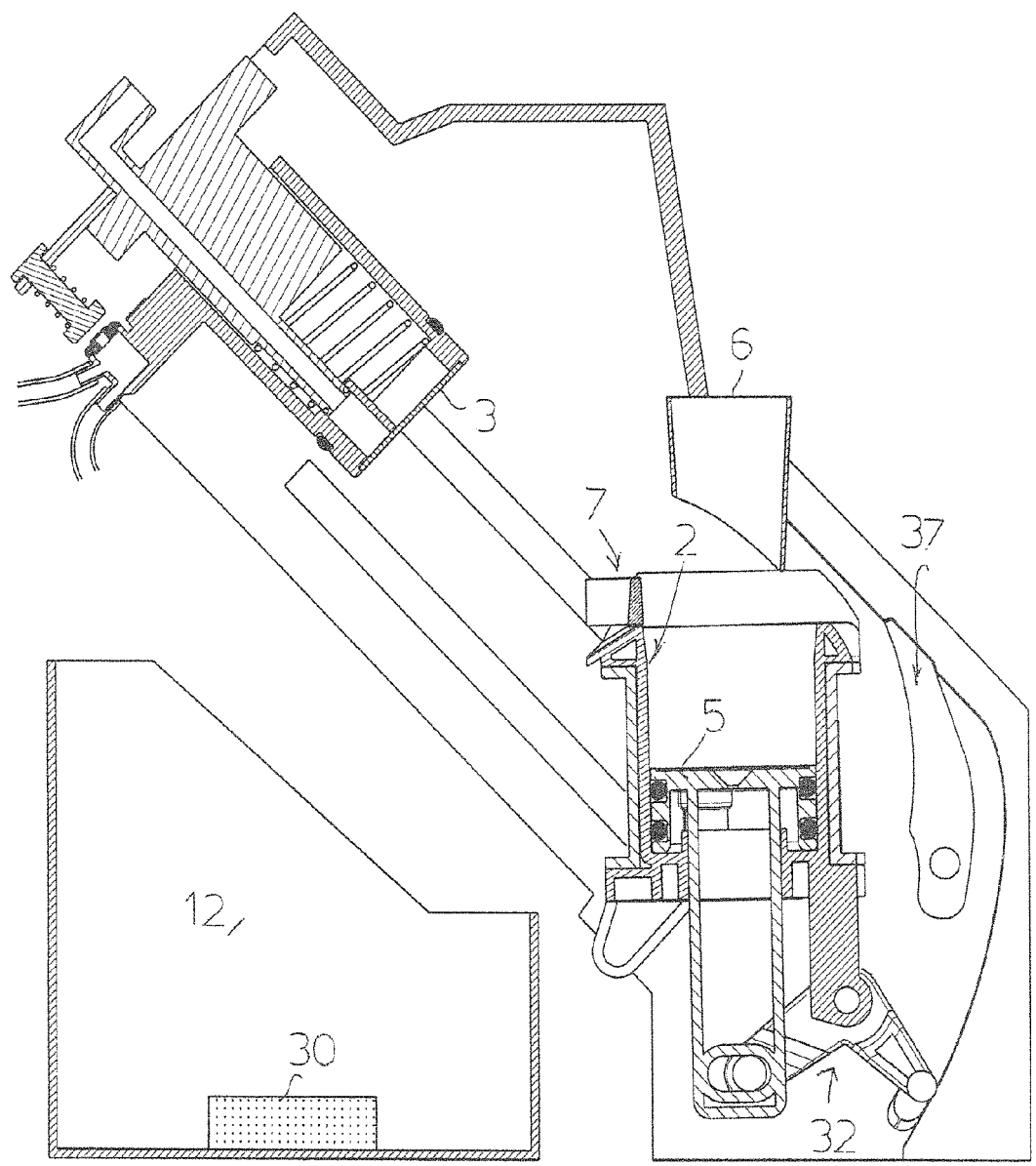

The infusion cylinder 2 ends the descent with an oscillation opposite the initial oscillation, by effect of the engagement of the pin 52 with the curvilinear portion 55 of the slot 51, with which it returns back into the position for loading a new load of coffee 30 (FIG. 13).

Figure 11:
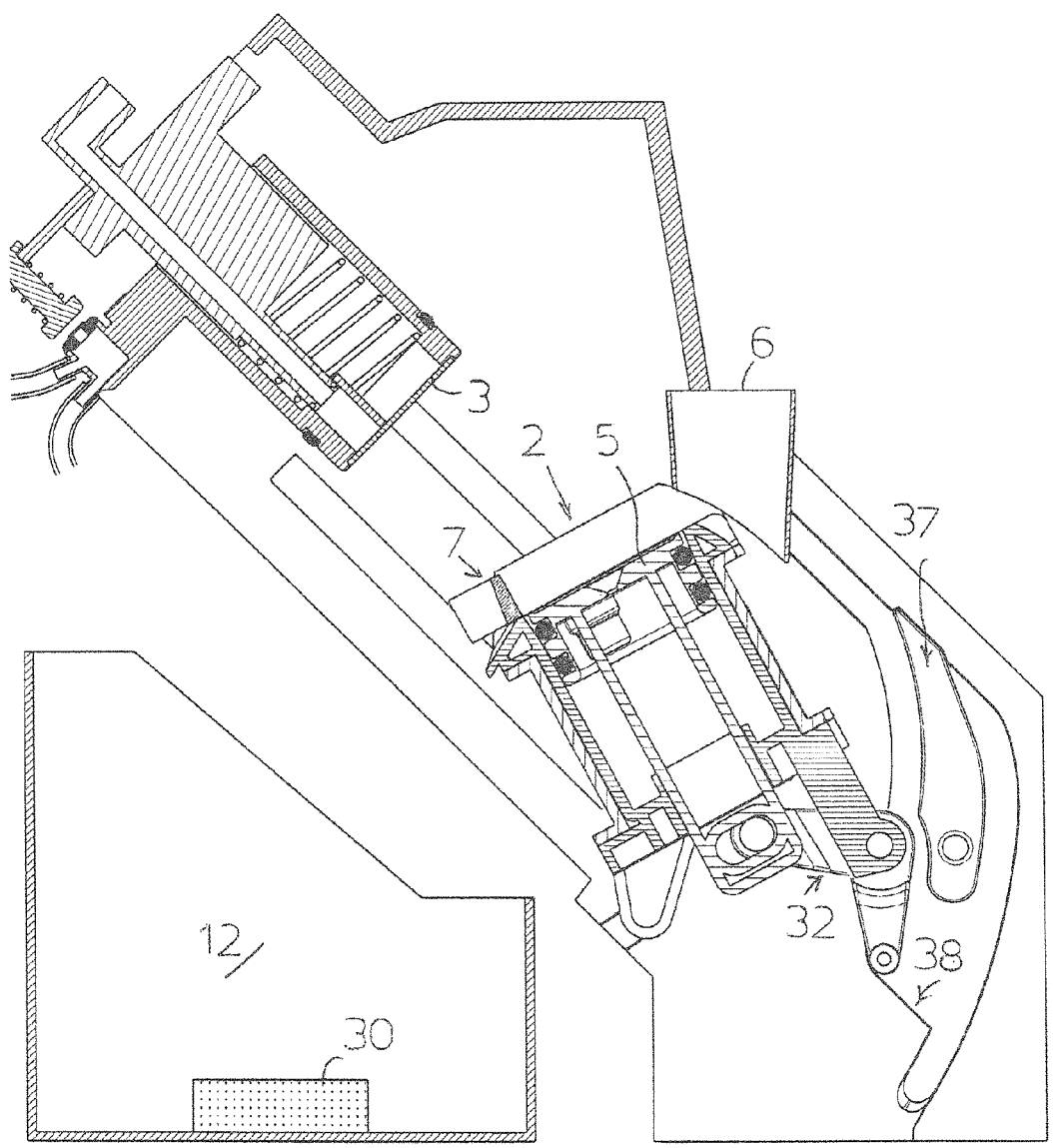
Figure 12:
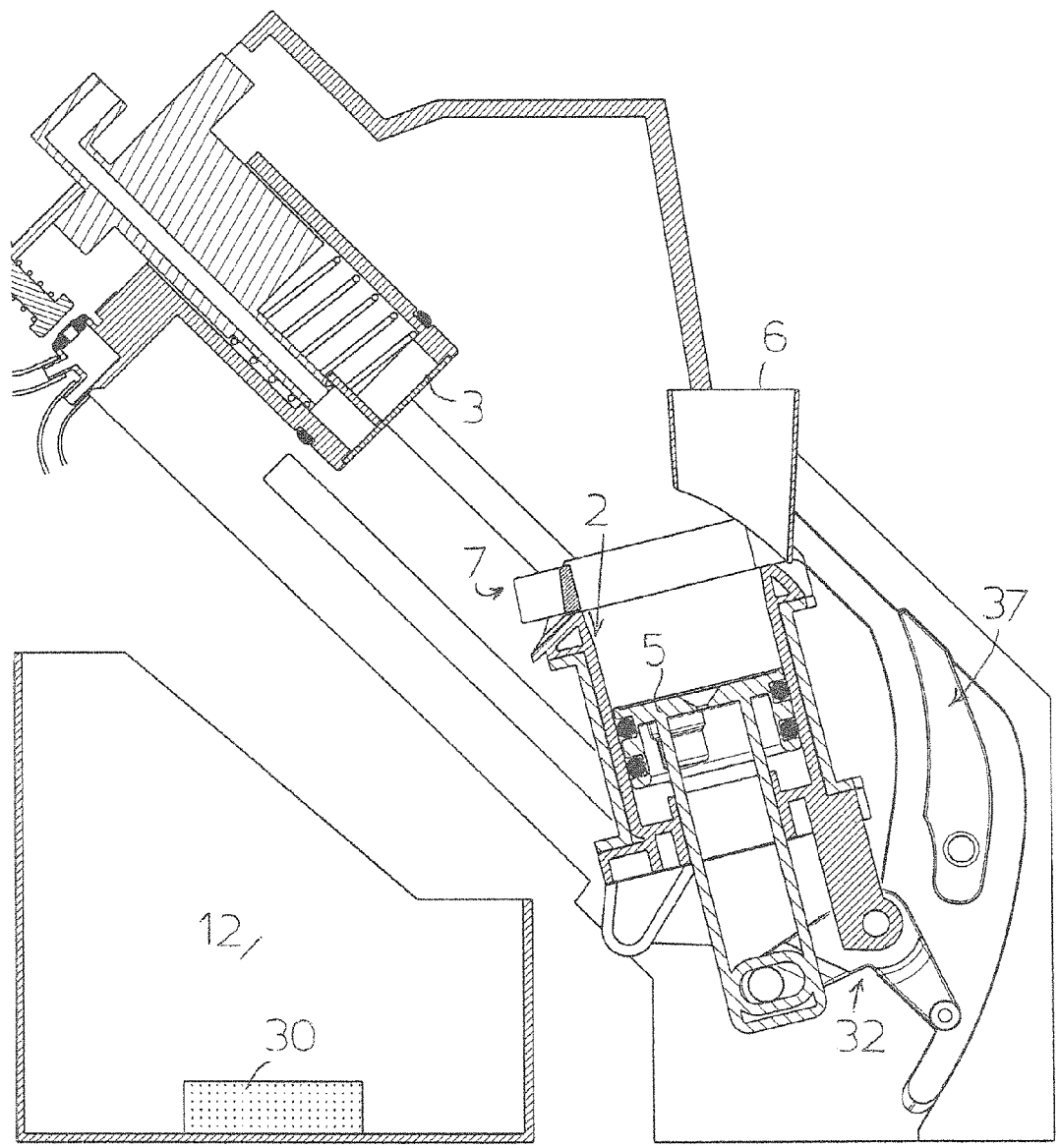

During the oscillation of the infusion cylinder 2, the engaging pin 36 engages with the second control cam 38, from which it receives a force of movement that causes the oscillation of the rocker 32 (in a counter clockwise direction in the drawings) around the oscillation pin 41. The oscillation of the rocker 32 causes the movement of the driving pin 34, which by effect of engagement in the slot 39 drives the stem 40 of the ejection piston 5 towards the retraction position (FIGS. 11 and 12).

The invention is particularly suited to a coffee machine with a prevalently vertical development, in which the infusion cylinder is located below the closing piston and has a component for translation movement that is inclined with respect to the resting surface of the coffee machine The infusion unit as conceived herein is susceptible to numerous modifications and variants, all falling within the scope of the inventive concept; moreover, all the details are replaceable by technically equivalent elements.

The materials utilized, as well as the dimensions, may in practice be of any type, according to requirements and the state of the art.

The invention claimed is:

1. An infusion unit for a coffee machine, comprising:
   a closing piston;
   an infusion cylinder, which is linearly reversibly movable along a worm screw parallel to an axis of the closing piston, between a position for loading a load of coffee, in which the infusion cylinder is disengaged from the closing piston and has an axis inclined relative to the axis of the closing piston, and an infusion position in which the infusion cylinder is engaged with the closing piston and has the axis in the direction of the axis of the closing piston;
   a piston for compressing the load of coffee against the closing piston and for ejecting the load of spent coffee, said piston sliding inside the infusion cylinder in a direction of the axis of the infusion cylinder between a retracted position and an extended position; and
   operating means for the ejection piston, wherein said operating means comprises an oscillating rocker having a first oscillating arm provided with a driving member for the ejection piston and a second oscillating arm provided with an engaging member for oscillating movement of the rocker selectively from a first control cam configured and arranged in such a manner as to generate an oscillation of the rocker in a direction corresponding to a driving towards the extended position of the ejection piston, or with a second control cam configured and arranged in such a manner as to generate an oscillation of the rocker in a direction corresponding to a driving towards the retracted position of the ejection piston, where the oscillating rocker is connected to the infusion cylinder for movement therewith, and where the first and the second oscillating arms are connected to one another.

2. The infusion unit of claim 1, wherein the driving member is constituted by a driving pin oriented in a direction of an axis of oscillation of the rocker and engaged slidingly in a closed traverse slot afforded in a stem of the ejection piston.

3. The infusion unit of claim 2, wherein the engaging member is constituted by an engaging pin oriented in the direction of the axis of oscillation of the rocker.

4. The infusion unit of claim 1, wherein the driving member is positioned at an end of the first arm of the rocker and the engaging member is positioned at an end of the second arm of the rocker.

5. The infusion unit of claim 1, wherein the rocker has an angular conformation.

6. The infusion unit of claim 1, wherein the first and the second arms of the rocker are of different lengths.

7. The infusion unit of claim 1, wherein the first control cam is afforded on a longitudinal element oscillating in contrast to and by action of an elastic element between a position resting against a stop and a position disengaged from the stop.

8. The infusion unit of claim 7, further comprising a shell delimiting a compartment for reversible movement of the infusion cylinder, said shell having a guide for an engaging pin of the engaging member, said guide being defined by a lateral delimiting wall of a lower part present in an internal side of the shell in which the elongated element is also positioned.

9. The infusion unit of claim 8, wherein the second control cam and the stop are afforded from shaped portions of the lateral delimiting surface of said lower part.

10. The infusion unit of claim 7, wherein the axis of oscillation of the longitudinal element is oriented in the direction of the axis of oscillation of the rocker.

11. The infusion unit of claim 1, wherein the second control cam is constituted by an inclined plane.

12. The infusion unit of claim 1, wherein said infusion cylinder is removably secured to a carriage sliding in the direction of the axis of the closing piston and supported in an oscillating manner with an axis of oscillation oriented in the direction of the axis of oscillation of the rocker.

13. The infusion unit of claim 1, further comprising a scraper element for scraping an access mouth of the infusion cylinder, and supported by the infusion cylinder in such a manner that the infusion cylinder can oscillate reversibly between a first and a second rest position, and in such positions, the infusion cylinder is offset from the access mouth of the infusion cylinder, said scraper element having a first scraping surface operating to unload the load of spent coffee when the ejection piston is in the extended position and the scraper element oscillates from the first to the second rest position, and a second conveying surface operating to convey the load of coffee from a loader to the infusion cylinder when the ejection piston is in the retracted position and the scraper element remains in the second rest position.

14. The infusion unit of claim 13, wherein the first scraping surface of the scraper element has an arcuate concave shape corresponding to an arcuate shape of a perimeter edge of the access mouth of the infusion cylinder, and in a first rest position of the scraper element, the infusion cylinder is positioned along a first portion of the perimeter edge of the access mouth of the infusion cylinder, and wherein the second conveying surface of the scraper element has an arcuate concave shape corresponding to the arcuate shape of the perimeter edge of the access mouth of the infusion cylinder, and in a second rest position of the scraper element, the infusion cylinder is positioned along a second portion of the perimeter edge of the access mouth of the infusion cylinder diametrically opposite the first portion of the perimeter edge of the access mouth of the infusion cylinder.

15. The infusion unit of claim 13, wherein the first scraping surface and the second conveying surface lie on the opposite side relative to a plane containing a fulcrum of oscillation of the scraper element.

\* \* \* \* \*